(12) United States Patent
Pennarun (10) Patent No.: US 10,849,306 B2
(45) Date of Patent: Dec. 1, 2020

(54) METHOD FOR COATING CHEESE PRODUCTS

(71) Applicant: FROMAGERIES BEL, Paris (FR)

(72) Inventor: Pierre-Yves Pennarun, Vendome (FR)

(73) Assignee: FROMAGERIES BEL, Suresnes (FR)

( * ) Notice: Subject to any disclaimer, the term of this patent is extended or adjusted under 35 U.S.C. 154(b) by 0 days.

(21) Appl. No.: 14/782,458

(22) PCT Filed: Apr. 4, 2014

(86) PCT No.: PCT/EP2014/056881
§ 371 (c)(1),
(2) Date: Oct. 5, 2015

(87) PCT Pub. No.: WO2014/162009
PCT Pub. Date: Oct. 9, 2014

(65) Prior Publication Data
US 2016/0050878 A1    Feb. 25, 2016

(30) Foreign Application Priority Data
Apr. 5, 2013 (FR) ...................... 13 53076

(51) Int. Cl.
*A01J 27/02* (2006.01)
*A23C 19/08* (2006.01)
(Continued)

(52) U.S. Cl.
CPC .............. *A01J 27/02* (2013.01); *A23C 19/084* (2013.01); *A23C 19/166* (2013.01); *B65B 9/023* (2013.01); *B65B 25/068* (2013.01)

(58) Field of Classification Search
CPC .......... A01J 27/00; A01J 27/005; A01J 27/02; A01J 27/04; A01J 27/045; A23C 19/084;
(Continued)

(56) References Cited

U.S. PATENT DOCUMENTS

| 970,396 A | 9/1910 | Royalty |
| 2,152,101 A | 3/1939 | Scherer |

(Continued)

FOREIGN PATENT DOCUMENTS

| CN | 1649572 A | 8/2005 |
| CN | 101374497 A | 2/2009 |

(Continued)

OTHER PUBLICATIONS

Gaulier, Jean Paul. Translation of FR 2886518. Dec. 2006.*

(Continued)

*Primary Examiner* — Ericson M Lachica
(74) *Attorney, Agent, or Firm* — Nixon & Vanderhye

(57) ABSTRACT

A method for preparing a coated cheese product, includes:

a) injecting a cheese material in the viscous state between two coating films, the films being malleable at the storage temperature of the coated cheese product, and each including, on the outer face, at least one external layer of a coating composition C1 in the gelled state, the coating composition including at least one hydrophobic polymer, and b) shaping at least a coated cheese product by pressure on the outer face of each coating film to obtain a coated cheese product including a cheese core including the material and a coating that is malleable at the storage temperature of the coated cheese product and sealed against moisture and microorganisms, and completely surrounds the core at its periphery, the coating being formed by assembly by pressure of the two coating films including at least an outer layer of the coating composition C1.

10 Claims, 2 Drawing Sheets

(51) Int. Cl.
*A23C 19/16* (2006.01)
*B65B 25/06* (2006.01)
*B65B 9/02* (2006.01)
*A23C 19/084* (2006.01)

(58) Field of Classification Search
CPC ......... A23C 19/00; A23C 19/05; A23C 19/06; A23C 19/16; A23C 19/166; B65B 25/06; B65B 25/068; A22C 17/10; B29C 43/08
See application file for complete search history.

(56) References Cited

U.S. PATENT DOCUMENTS

| | | | |
|---|---|---|---|
| 2,288,327 A | 6/1942 | Scherer | |
| 2,402,605 A * | 6/1946 | Cowen | B65D 65/42 426/127 |
| 3,542,570 A | 11/1970 | Bush et al. | |
| 3,648,834 A * | 3/1972 | Gifford | B29C 35/10 206/525 |
| 4,586,317 A | 5/1986 | Bussell | |
| 6,217,309 B1 * | 4/2001 | Jens | B65B 25/06 425/235 |
| 6,949,256 B2 * | 9/2005 | Fonkwe | A61K 9/4816 106/162.1 |
| 2002/0034622 A1 * | 3/2002 | Edwards | B32B 27/08 428/220 |
| 2003/0008083 A1 * | 1/2003 | Harhen | B29C 51/08 428/34.1 |
| 2003/0138482 A1 | 7/2003 | Fonkwe et al. | |
| 2003/0194566 A1 * | 10/2003 | Corzani | B32B 27/22 428/424.2 |
| 2003/0215555 A1 * | 11/2003 | Leigner | B32B 27/18 426/570 |
| 2004/0037920 A1 | 2/2004 | Choulet et al. | |
| 2005/0257875 A1 * | 11/2005 | Khan | B32B 11/00 156/60 |
| 2006/0246242 A1 * | 11/2006 | Siegel | A23B 4/10 428/34.1 |
| 2007/0031546 A1 * | 2/2007 | Nelson | B32B 27/32 426/106 |
| 2007/0141214 A1 * | 6/2007 | Kramer | A21D 6/00 426/321 |
| 2008/0147034 A1 * | 6/2008 | Wang | A61F 13/15252 604/370 |
| 2011/0126972 A1 * | 6/2011 | Frerot | A61F 13/0276 156/243 |
| 2011/0212226 A1 * | 9/2011 | Soane | A23P 20/12 426/96 |
| 2012/0064206 A1 * | 3/2012 | Pennarun | A23C 19/163 426/307 |

FOREIGN PATENT DOCUMENTS

| | | | |
|---|---|---|---|
| CN | 101484370 A | | 7/2009 |
| CN | 102164498 A | | 8/2011 |
| CZ | 122635 | * | 8/1984 |
| DE | 101 22 635 A1 | | 11/2002 |
| EP | 1 788 884 A1 | | 5/2007 |
| EP | 1 345 497 B2 | | 4/2011 |
| FR | 643 128 A | | 10/1927 |
| FR | 2 778 821 A1 | | 11/1999 |
| FR | 2 818 501 A1 | | 6/2002 |
| FR | 2 886 518 A1 | | 12/2006 |
| FR | 2886518 A1 | * | 12/2006 ............. A01J 25/13 |
| FR | 2 926 792 A1 | | 7/2009 |
| GB | 899 176 A | | 6/1963 |
| JP | 2000-355389 A | | 12/2000 |
| JP | 2002-010771 A | | 1/2002 |
| JP | 3610514 B2 | | 1/2005 |
| JP | 2005-059860 A | | 3/2005 |
| JP | 2009-539719 A | | 11/2009 |
| JP | 2011-225576 A | | 11/2011 |
| WO | 00/73148 A1 | | 12/2000 |
| WO | 01/04195 A1 | | 1/2001 |
| WO | 03/039727 A2 | | 5/2003 |
| WO | 03/039965 A1 | | 5/2003 |
| WO | 03/051130 A2 | | 6/2003 |
| WO | 2006/030128 A1 | | 3/2006 |
| WO | 2006/131625 A1 | | 12/2006 |
| WO | 2007/033296 A1 | | 3/2007 |
| WO | 2007/149276 A2 | | 12/2007 |
| WO | 2008/105752 A1 | | 9/2008 |
| WO | 2008/151820 A1 | | 12/2008 |

OTHER PUBLICATIONS

"Malleable." Collins English Dictionary. Jun. 25, 2012. <https://www.collinsdictionary.com/dictionary/english/malleable>. Accessed Jun. 8, 2017.*

"Pliable." Collins English Dictionary. Jun. 10, 2012. <https://www.collinsdictionary.com/dictionary/english/pliable>. Accessed Jun. 8, 2017.*

"Heat Seal Technology and Important Test Indexes." Labthink International Inc. Sep. 13, 2012. <http://www.labthinkinternational.com/literatures/heat-seal-technology-and-important-test-indexes.html>. Accessed Jun. 8, 2017.*

International Search Report, dated Oct. 22, 2014, from corresponding PCT application.

FR Search Report, dated Dec. 17, 2013, from corresponding FR application.

* cited by examiner

FIG.1

FIG.2

METHOD FOR COATING CHEESE PRODUCTS

The present invention relates to a method for preparing a coated cheese product and the coated cheese products so obtained. More particularly, the invention relates to packaging a cheese material in viscous form in a coating having the mechanical properties of a malleable wax at the storage temperature, wherein the coating is sealed against moisture and microorganisms.

The coating of cheese products is generally effected by dipping, spraying or rubbing the cold and frozen products with a coating wax of fossil or renewable origin, brought to the molten state, as described, for example, in the patent application FR 643128. This type of product, packaged, for example, in portions of 20 g to 100 g, is generally kept cold because non-sterile. The wax coats the cheese product, but the shelf life is only a few days at room temperature. Known installations for coating by dipping/spraying are not suited to packaging in perfectly sterile conditions.

These coated products are subject to strong consumer demand due, in particular, because they are very easy to take anywhere and because of their playful character as a result of the malleability of the coating and its tearability properties.

Furthermore, the melted cheese type of product, particularly those which are in the form of a viscous paste, are generally packaged in non-malleable rigid packaging, whose shape is prefabricated (plastic tray, pre-stamped aluminium film . . . ), as described, for example, in patent applications FR 2 926 792 and FR 2 886 518. The properties of the material used are such that the package retains its shape and can be sealed to isolate the product from the external environment. In this method, the cheese product is usually transported in the viscous state and poured into trays or in a bi-shell at a temperature of about 70° C., wherein the heat of the product greatly reduces the risk of microbiological contamination coming from the package and packaging operation.

However, there is no known method for coating the cheese product in the viscous state, whether packaged hot or cold, in a coating material having the advantageous properties of a malleable wax coating after cooling at the usual temperature for consumption or conservation (1 to 40° C.), in particular with respect to its barrier properties against moisture and micro-organisms and its ability to be easily opened by manual tearing of the coating.

Conventional packaging in wax by dipping or spraying is impossible for cheese products in the molten and viscous state. In fact, at the packaging temperature, the cheese product and the coating are both in a viscous state, and are likely to partially mix if their respective viscosities are too close to one another.

One is thus seeking a cheese product that can be packaged in hot or cold viscous form in a coating of one or more layers, wherein the coating material is sufficiently hydrophobic to provide the cheese product with good protection and storage properties, offering a total barrier against external agents (bacteria and mould altering the product) and a barrier against moisture to prevent water loss from the cheese product (less than 1% weight loss over a period of 6 months).

Outside the field of cheese, one indeed knows of capsule manufacturing processes involving non-food products, whose coating consists of a water-soluble composition. Such capsules are, for example, bath beads containing a cosmetic product or capsules with a medicinal solution which releases the medicine on ingestion by the patient. Such methods, described for example in international patent applications WO 03/039727 or WO 03/039965, use water-soluble compositions such as compositions comprising gelatin, starches, synthetic polymers such as certain acrylic polymers, biopolymers such as polysaccharides, gums, modified gelatins, pullulans, glucomannans, or cellulose and its derivatives. However, as these coatings are water-soluble and highly permeable to water, they are therefore unsuitable for the coating of cheese products.

The applicant has succeeded in developing a method and an associated coating composition that is particularly suitable for the packaging of cheese products in a hot or cold viscous state, wherein the coating has the properties of a cold wax coating and its advantages in the storage of products and their ability to be taken anywhere.

Coating Method

To this end, the invention relates to a method for preparing a coated cheese product, wherein the method comprises the following steps:

a) injection of a cheese material in the viscous state between two coating films and in contact with the said films, wherein the said films are malleable at the storage temperature of the said coated cheese product and each comprise, on the outer face, at least one external layer consisting of a coating composition C1 in the gelled state, wherein the said coating composition comprises at least one hydrophobic polymer, and b) preparation of at least a coated cheese product by pressure on the outer face of each of the two said coating films, in order to obtain a coated cheese product comprising a cheese core comprising the said material and a coating that is malleable at the storage temperature of the said coated cheese product and sealed against moisture and microorganisms, and completely surrounds the core at its periphery, wherein the said coating is formed by the pressure of the two said coating films and comprises at least an outer layer of the said coating composition C1.

As used herein, the "storage temperature" refers to the temperature or temperature range at which the coated cheese product according to the invention is stored prior to consumption. This temperature is between 1° C. to 40° C., preferably 1° C. to 30° C., more preferably from 1° C. to 20° C., e.g. between 2° C. to 10° C.

According to a variant of the inventive method, the said films each further comprise, on the inner face, at least one inner layer of a coating composition C2 in a gelled state, and that is different from the said coating composition C1.

According to this variant, the coating obtained at the end of the preparation step b) comprises at least an outer layer of the said at least one coating composition C1, and at least one inner layer, different from the said at least one outer layer consisting of at least one coating composition C2, between the core and the said at least one outer layer.

Coated Cheese Product

The invention also relates to the coated cheese product obtainable according to the method according to the invention or according to the variant described above.

This has a coating that is malleable at storage temperature, wherein the said coating is preferably tearable.

According to one embodiment, the core of the coated cheese product is made of cheese material.

The core of the coated cheese product may optionally be in the form of a core/shell type structure, wherein the said core consists of an edible filling, different from the cheese material and completely surrounded at its periphery by the said shell, itself made of the cheese material.

As an edible filling may be used, for example, a liquid edible composition, gelled or viscous, cheese or not. Typically, one may use an edible composition that is based on cheese(s), vegetable(s), cereal(s), chocolate or fruit(s).

Figure 1:
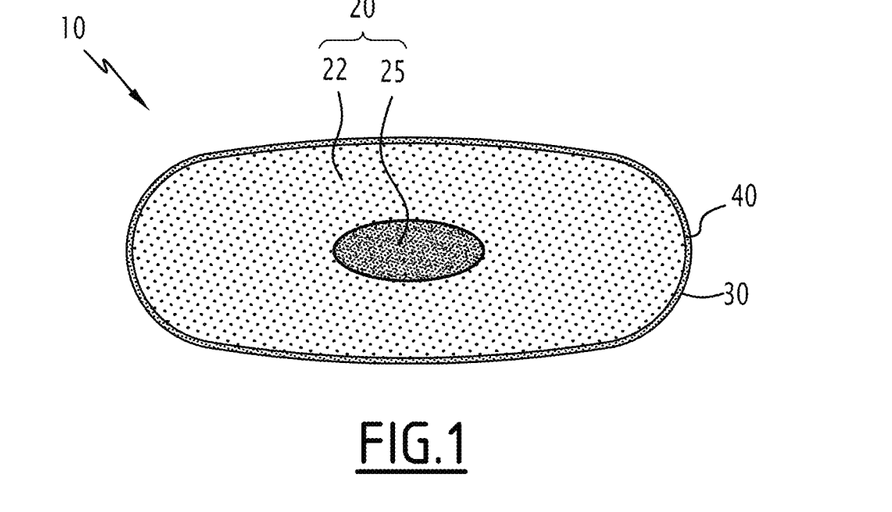

In the context of the present application, as shown schematically in section in FIG. 1, the term "coated cheese product" (10) refers to an edible product comprising:
- a core (20) comprising a cheese material (22) and possibly an edible filling (25), and
- a coating (30) sealed against moisture and completely surrounding the core (20) at its periphery, wherein the said coating (30) comprises at least one outer layer (40) consisting of at least one coating composition C1.

In the context of the present application, as shown schematically in section in FIG. 1, the term "coated cheese product" (12) also refers to an edible product comprising:
- a core (20) comprising a cheese material (22) and possibly a food filling (25), and
- a coating (35) sealed against moisture and completely surrounding the core (20) at its periphery, wherein the said coating (35) comprises at least one outer layer (40) consisting of at least one coating composition C1, and at least one inner layer (45) that is different from the said at least one outer layer (40) consisting of at least one coating composition C2 located between the core (20) and the said at least one outer layer (40).

Figure 3:
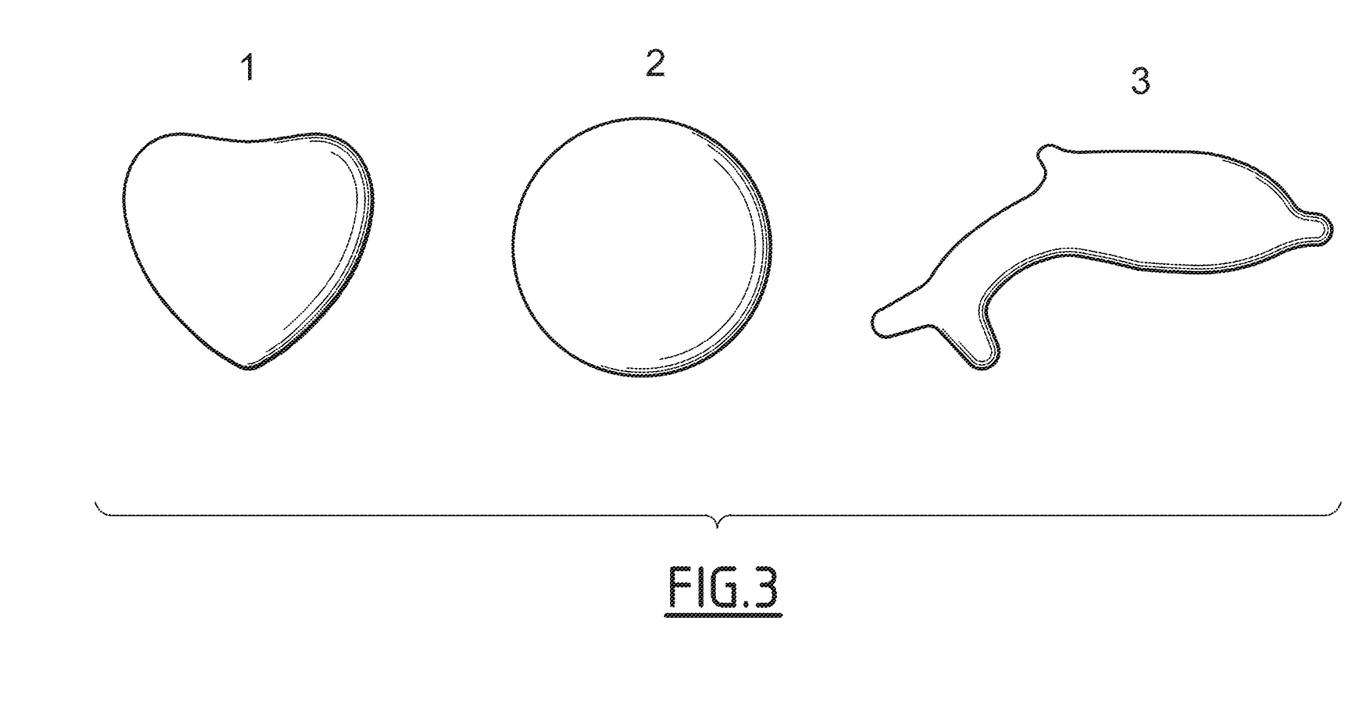

FIG. 3 shows various examples of possible forms of the coated cheese product according to the present invention.

By "include a" or "have a" one means respectively "include at least one" or "have at least one" unless the contrary is explicitly specified.

The term "X includes Y and Z" also covers the preferred embodiment wherein "X consists of Y and Z", unless the contrary is explicitly specified.

According to one typical embodiment shown in FIG. 1, the coating of the coated cheese product comprises an outer layer of a coating composition C1. According to this embodiment, the outer layer is in contact with the air and insulates the interior of the coated cheese product from the outside, in particular from moisture, microorganisms, and, possibly, the air.

Figure 2:
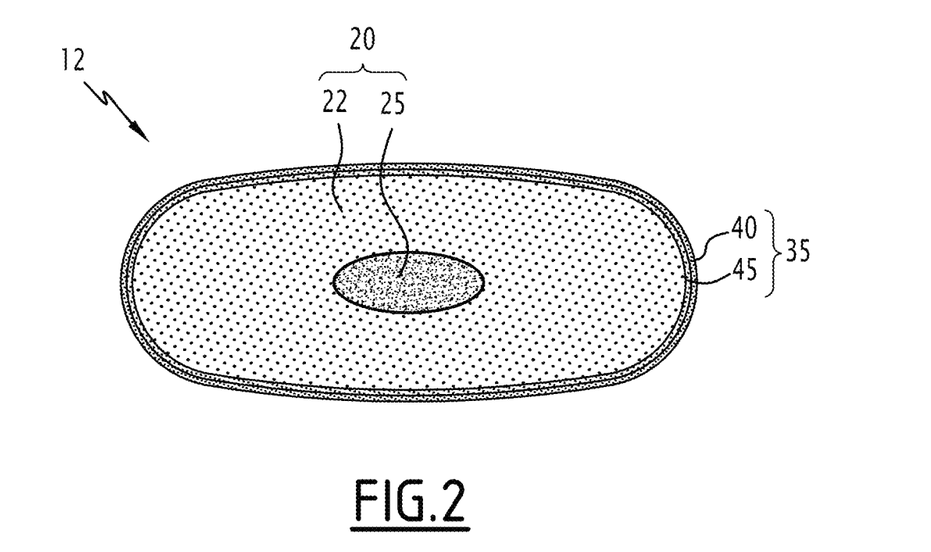

According to another typical embodiment shown in FIG. 2, the coating of the coated cheese product includes or consists of an outer layer of a coating composition C1, and an inner layer of a coating composition C2, wherein the said inner layer is in contact with the cheese material and the said outer layer. According to this embodiment, the inner layer completely isolates the cheese material of the outer layer, while the outer layer is in contact with the air and insulates the interior of the coated cheese product from the external environment, especially moisture and microorganisms.

According to an advantageous embodiment, the coating of the coated cheese product is a multilayer coating consisting of:
- an inner layer in contact with the cheese material and completely covering it,
- an intermediate layer in contact with the said first inner layer and completely covering it, and
- an outer layer, identical or different from the said inner layer, in contact with the said intermediate layer and completely covering it.

In this mode, at least the outer layer consists of a hydrophobic coating composition that isolates the cheese material from the external environment, particularly moisture, microorganisms, and, possibly, the air.

The properties of the inner and outer layers are detailed below.

The present invention also offers the advantage of obtaining a coated cheese product that can be fashioned according to various geometries during the preparation stage due to the ductile properties of the coating.

More particularly, the method of the invention allows access to coated cheese products of various sizes and shapes, such as a thick disk (Minibabybel® type), geometric forms such as a heart shape (1), a ball (2), an ovoid shape, triangular or rectangular, shapes of animals (3), fruits and vegetables, bottles, etc. . . . . Moreover, because of its viscosity properties during injection, the cheese product also takes the form of the mould and thus its coating. The coated cheese products may have be of a single serving size (about 5 to 40 g) or a group size (40 to about 600 g).

In contrast to portions of fresh cheeses or processed cheeses packaged in rigid or flexible film coatings, in aluminium for example, the coating method according to the invention allows one to obtain cheese products coated with a perfectly sealed and hermetic coating, with or without an opening system, which considerably reduces the risk of contamination.

According to the opening requirements, an opening system may be advantageously incorporated between the cheese and the coating material or even in the coating structure. The said opening system is typically placed on one of the coating films or integrated thereto, prior to injection of the cheese material into contact with the coating films. This opening system is similar to what can be found in the case of cheese in wax (fromages sous cire (tab)) or on tearable and peelable lids (tearable tape), or even in the form of a reinforcement fabric that can be found in so-called "prepreg" composite materials. This opening system allows tearing of the fabric with malleability properties known to the person skilled in the art, namely properties similar to those of a cheese wax that can be seen on products such as Gouda, Babybel® or the MiniBabybel®. This malleability can be described by the penetration coefficient of the material at 25° C. measured according to ASTM D1321-10, and is typically 0.5 to 6.0 mm. After tearing the coating material, the product can be extracted manually from the coating in several steps depending on the number of coating segments obtained after tearing.

Several important advantages of the method according to the invention are further described below compared with methods according to the prior art as implemented in a normal cheese facility with moulding units.

The space occupied by the devices for implementing the method according to the invention is reduced, which may even allow having a mobile manufacturing facility. In fact, the method does not require the use of individual moulds and the facility does not require storage space for the said individual moulds. Furthermore, according to the method of the invention, the change to rotary moulds to produce cheese products of any shape is greatly simplified.

In addition, the solidification time (gelling) of cheese materials in individual moulds before coating, typically at least two days after injection, is avoided, wherein this solidification takes place directly within the coating.

The method according to the invention allows the continuous production of coated cheese products, and can be easily automated by controlling the injection rate of the cheese material.

Coating Films

Before injection step a), the coating films are preferably previously formed by providing coating composition C1 or coating compositions C1 and C2 in the viscous state.

The provision of the said coating composition C1 and/or C2 in the viscous state is advantageously followed by a cooling step in which the said coating composition C1 and/or C2 pass to the gelled state.

The coating composition C1 is typically poured in the viscous state on two separate rollers, then cooled in contact with the said rollers in order to pass to the gelled state and thus form the outer layer of each of the two coating films.

When a coating film further comprises an inner layer, a coating composition C2 is deposited on the outer layer of the coating composition C1 already formed on a roller, and possibly already in the gelled state, in order to form the said inner layer.

By "viscous", one means that the coating composition flows like a fluid under the action of gravity or under the action of pressure applied to the said coating composition, typically during its provision.

By "gelled state", one means that the materials of the coating compositions are solidified and substantially solid and do not flow under the action of gravity or under the action of pressure. In the "gelled" state, however, these materials are sufficiently malleable to allow sealing of the coated cheese product during the preparation step.

According to the present invention, the "gelled" state especially denotes the "semi-crystalline solid" state, which is obtained after crystallisation of the said materials.

In the context of the present invention, "plastic material" means a material having a ductile plastic behaviour, i.e. the ability to deform in a non-reversible manner under the effect of a single mechanical stress by stretching or compression. Moreover, following this first deformation, and due to its malleability properties, this material also has the ability to be shaped, cut and reassembled like modelling clay at the temperature of storage or consumption. A malleable material thus differs from film-type packaging or shell material that typically consists only of polyethylene or polypropylene, which, after stretching, cannot be re-shaped at the temperature of storage or consumption.

The malleability of a material is typically measured by a coefficient of penetration of a punch into the material, using the method defined in ASTM D1321-10. For a material said to be malleable, the penetration coefficient measured at 25° C. typically ranges from 0.1 to 12.0 mm, preferably from 0.1 to 9.0 mm and more preferably from 0.1 to 6.0 mm.

By "ductile material", one means a plastic material whose distortion produced by mechanical stress, is resilient at first and then permanently acquired by viscous flow.

During its provision, the said at least one coating composition C1 is typically heated to a temperature $T_1$ at which the said composition C1 is in the viscous state. The temperature $T_1$ is preferably from 70° C. to 180° C., more preferably 70° C. to 130° C.

The temperature $T_1$ is higher than the transition temperature of the liquid-solid (TLS) or the liquid-gel (TLG) of the coating composition C1 (temperature at which the coating composition C1 changes from the viscous liquid state described above to the semi-crystalline solid state or gelled state described above), and is preferably greater than 2° C. at 30° C., and more preferably greater than 2° C. at 20° C., than the said TLS or TGL temperature.

During its provision, the said at least one coating composition C2 is typically heated to a temperature $T_2$ at which the said composition C2 is in the viscous state. The temperature $T_2$ is preferably from 70° C. to 120° C., more preferably 70° C. to 100° C.

The temperature $T_2$ is higher than the transition temperature of the liquid-solid (TLS) or liquid-gel (TLG) of the coating composition C2 (temperature at which the coating composition C2 changes from a viscous liquid to the semi-crystalline solid state or to the gelled state), and is preferably greater by 2° C. at 30° C., and more preferably greater by 2° C. at 20° C. than the said TLS or TGL temperature.

The two films, being separated prior to the injection of the cheese material, may have different structures and different properties, especially in terms of colour or surface texture.

According to one embodiment, at least one of the coating films is monolayer, i.e. it consists of a single layer of a coating composition C1. The two films may also be monolayer coatings, wherein each consists of a coating composition C1 that may be the same or different.

Alternatively, at least one of the two coating films is multilayer, i.e. it consists of at least two layers. A multilayer film may be bi-layer, i.e. consist of an inner layer and an outer layer that is different from the inner layer.

A multilayer film may consist of a superposition of three or more layers of different compositions. Preferably, similar types of layers (for example, hydrophilic or hydrophobic) are in contact with one another.

In a multilayer coating, especially when the coating comprises one or more hydrophobic layers and one or more hydrophilic layers, the hydrophilic layer(s) are advantageously a barrier against migration of the constituents of the hydrophobic layers towards the cheese material (and vice versa), while the hydrophobic layer(s) preferably ensure(s) a barrier against moisture and microorganisms.

In a multilayer coating film as described above, typically comprising an inner layer, an intermediate layer and an outer layer, the said intermediate layer serves as a compatibilising agent between the said inner and outer layers.

By "compatibilising agent", one means a material ensuring adhesion between two layers whose adhesion properties are weak or non-existent. The compatibilising agent may be a polymer, a polymer containing additives, a polymer having ionic functional groups, a polymer blend or a polymer containing filling agents.

Alternatively, a compatibilising material may be incorporated in the said inner layer and/or the said outer layer.

The outer face of the said films is intended to constitute the outer surface of the coating of the coated cheese product, which itself will be in contact with the air.

The inner face of the said films is intended to form the inner surface of the coating of the coated cheese product, which itself will be in contact with the cheese material.

Each of the films typically has a thickness of 0.1 mm to 5 mm, preferably 0.1 mm to 3 mm, more preferably 0.2 mm to 2 mm.

According to one embodiment, an opening system is added during the formation of the coating films.

Infection

The injection step is typically carried out by continuously unwinding the two coating films in the gelled state with each facing the other, and injecting the cheese material to be coated in the viscous state between the two films, typically with the aid of an injection nozzle.

Prior to the injection of the cheese material between the two coating films, the said films are preferably brought close to one another in order to delimit a space intended to be filled by the cheese material injected in the viscous state.

Where the core of the coated cheese product includes a food filling, the said filling and the cheese material in the viscous state are typically co-injected with the aid of a coaxial nozzle having a central orifice through which the filling is injected and a peripheral orifice through which the cheese material is injected.

The cheese material injected in step a) is brought to a temperature $T_a$ at which the said cheese material is in the viscous state.

By "viscous state", one means that the cheese material flows like a fluid under the action of gravity or under the action of a pressure applied to the said cheese material.

The temperature $T_a$ is preferably from 50° C. to 100° C., more preferably 70° C. to 95° C. and, for example, from 70° C. to 75° C.

Preferably, the temperature $T_a$ is lower than the TLS or TLG of the coating composition C1. When coating layer C2 is present, the temperature $T_a$ is preferably lower than the TLS or TLG of the coating composition C2. This prevents the injection of the cheese material in the viscous state in contact with the coating film in the gelled state destabilising the structure of the said films.

Shaping

The combination of the two coating films and the cheese material (and optionally the filling) injected at the end of injection step a) is then shaped in step b), to yield a coated cheese product or a series of coated cheese products as defined above.

By "shaping", one means the moulding and the sealing of the coating around the core of cheese material, by means of which one obtains a, or a series of, coated cheese product(s), which are sealed and airtight.

The shaping step is, for example, carried out by introducing the two coating films and the cheese material together between two rotating rollers featuring complementary half-cavities to impress the desired shape on the coated cheese products. Examples of machines to achieve these coatings of cheese material are the so-called "softgel" machines from Caplustech, such as the "R1 softgel machine".

During the shaping, the films are preferably kept at a temperature below the melting or gelling temperature of the coating compositions, and preferably below 2° C. to 30° C., more preferably 2° C. to 15° C. than the said melting or gelling temperature to give the films high malleability properties and allow their sealing under pressure, for example, between the rotating rollers described above.

Preferably, during the shaping step, the films are not heated to a temperature exceeding their melting or gelling temperature.

The implementation of this embodiment is for example carried out by means of the devices used to prepare the "softgel" type of capsules (RP Scherer), described in patents U.S. Pat. Nos. 1,970,396, 2,152,101 and 2,288,327.

The shaping step of the inventive method allows the shaping of the coating around the cheese material and the sealing of the said coating, wherein the sealing area is integrated in the coating surface. Preferably, the shaping step enables one not to leave a visible sealing area, such as a lip or bulge. Thus, the coating is tearable by a voluntary mechanical opening action.

To facilitate this opening, one advantageously uses an opening system that is integrated during the shaping of the coating films or the shaping of the coating, and allows tearing of the coating to give access to the cheese material.

The shaping step enables one to package, in one step, the cheese material in its coating without the risk of contamination during packaging.

In particular, the method according to the invention enables the packaging of hot or cold cheese material in the viscous state in a coating that is sealed against moisture and microorganisms. Once the injection has been performed, the shaping step preferably follows immediately. The method according to the invention thus enables one to package a cheese material without the risk of external microbial contamination during the said packaging step until the consumption of the product.

The method according to the invention allows the continuous production of coated cheese products, and can be easily automated by controlling the injection rate of the cheese material.

Following the shaping step, the coated cheese product obtained is typically released and collected.

The cheese material may be cooled during the shaping or after the shaping in a subsequent cooling step to a temperature below 20° C., more particularly lower than 6° C. (usual storage temperature in a refrigerator), for example between 0 and 6° C.

The invention thus enables increased food safety of the coated cheese product obtained, and thus its shelf life, while maintaining its organoleptic properties and offering the consumer a fun package. Indeed, because of its malleable coating at the temperature of consumption and storage, the consumer, and especially children, will have fun with this coating material as with modelling clay.

Cheese Material

In the context of this application, by "cheese material", one means any food product:
- obtained by processing milk, whether the latter is cow, goat, sheep, buffalo, milk etc., and/or
- obtained at least partly from raw materials of milk origin, and optionally other food ingredients.

To be suitable for implementing the method according to the invention, it is desirable that the cheese material is presented in an easily injectable viscous form which then solidifies into a sufficiently solid texture, especially gel-like, In order not to flow undesirably from the coating during the tearing of the coating.

The cheese materials include especially:
- "processed cheese" and processed cheese specialties (e.g. Vache qui Rit®), obtained from the melt (typically in the presence of melting salts) of natural cheeses,
- cheese specialties, obtained by processes other than melting processes, especially cheese specialties obtained by so-called recombination processes (as described in WO 2008/151820 and EP 1788884), and retexturing processes (as described in patents FR 2 778 821 and FR 2 818 501), and
- any other cheese or cheese product such as fresh cheese or fresh processed cheese (typically obtained from lactic curd for example, as known to persons skilled in the art) having a viscous structure suitable for use according to the method of the present invention (e.g, Kiri® or Boursin®).

The cheese material used in the context of the method according to the invention is typically a processed cheese, a fresh cheese, a fresh processed cheese or a cheese obtained by a recombinant process.

The cheese material according to the invention is easily injectable through an injection nozzle, especially when in the viscous state.

By "viscous state" at temperature T, one means that the cheese material, brought to this temperature, flows like a fluid under the action of gravity or under the action of a pressure applied to the said cheese material, typically during its injection.

A cheese material in the viscous state typically has a shear viscosity from 0.1 to 1000 Pa·s, and more preferably from 1 to 100 Pa·s as measured at 75° C. and at a shear rate of 10 s$^{-1}$ with a Rheolab QC rheometer from Anton Paar.

Preferably, the cheese material of the final coated cheese product is a processed, fresh or fresh processed cheese, which is in the form of a spreadable paste at the consumption temperature, typically 4° C. to 25° C.

Preferably, the cheese material of the final coated cheese product is a cheese, processed or not, which is in the form of a stiff dough at the consumption temperature, typically 4° C. to 25° C.

To obtain a "natural cheese", the starting milk is standardised or not in protein and fat, pasteurised or unpasteurised, and coagulated, either by the action of coagulating agents such as rennet or its substitutes, or by seeding the milk with lactic acid bacteria and acidification until the isoelectric point of casein (pH=4.6) or by the combined action of the two preceding embodiments, drained, shaped, cured and possibly pressed and/or ripened by the action of a specific ripening flora which is allowed to develop under the best conditions in ripening rooms until the desired organoleptic characteristics are achieved.

According to the nature of the milk, the coagulation mode, the presence or absence of a refining step, one obtains a wide range of starting materials that are classified in fresh cheese (lactic coagulation, little or no refining, low solids content (generally less than 40%), soft cheeses (mixed coagulation, draining and possibly refining, higher solids content than the previous: more than 35-40% but generally less than 50%) and pressed cheeses (rennet coagulation, pressing and often ripening, and high solids content, greater than 45%).

According to one embodiment, the cheese material used in the method according to the invention is a natural cheese, such as cream cheese. One can also use a cheese material based on soft cheese or pressed paste cheese, possibly retextured.

In another embodiment, the cheese material used in the method according to the invention is a processed cheese.

By "processed cheese" or specialty processed cheese, one means the product obtained by melting, under thermomechanical treatment and usually under partial vacuum, cheeses with or without melting salts. The raw materials used are preferably pressed paste cheeses but any type of natural cheese as defined above is also appropriate. One can also use "curdled" cheeses with a rennet or lactic acid character.

Moreover, one may add to the formula powdered milk, skimmed or not, butter, AMF (anhydrous milk fat), whey powder or protein concentrates in liquid or powder form. One can partially or completely replace milk fat with vegetable fat and protein with plant protein. The formula may also include texture agents such as hydrocolloids. The use of these is an advantage when using wet raw materials (low solids content) to obtain products with very soft texture. The manufacture of cheese is fully described in the Book by ECK and GILLIS J. C., A "Le fromage", 3rd edition, Ed. Lavoisier Paris, to which reference may be made for further details.

In the context of the invention, one prepares according to traditional techniques, processed cheese or a processed cheese preparation by melting cheese of one category or a mixture of varieties according to the taste characteristics that are to be obtained.

Furthermore, the starting cheese raw material is based on the organoleptic characteristics that one wants to give the cheese or the processed cheese raw material or to the final product. For example, if one wants to give the final product organoleptic characteristics (taste and aroma) of products of soft paste type cheese like Camembert, one prepares a processed cheese from Camembert.

In a preferred embodiment of the invention, the cheese raw material to be processed will be chosen from the family of soft paste cheeses with a natural rind, fresh cheeses or fresh lactic or rennet curd or a mixture of these components.

One may mention for the starting cheeses, soft paste cheeses with a white rind such as Brie or Camembert, blue-veined cheeses such as Gorgonzola and Roquefort, cheeses with a colourful crust like Munster and Maroilles, hard cheeses such as Gouda, Edam, Cantal, Emmental, Maasdam and old or young Cheddar.

Processed cheeses are generally prepared by heat treatment at a temperature of 60° C. to 100° C. and low shear mechanical treatment.

By "low shear", one means stresses no greater than those performed in "cutter" type equipment at speeds up to 1200 rpm.

One may mention treatments carried out in commercial-type cutters (for example, those marketed under the name STEPHAN®) that are traditionally used in delicatessens or processed cheese production and running at speeds between 250 and 1200 rpm, preferably 300 and 600 rpm; kneading appliances, blenders, mixers, cooker-mixers, agitators, extruders are also suitable.

In yet another embodiment, the cheese material used in the method according to the invention is another cheese specialty.

By "other cheese specialties", one means any known cheese specialty obtained by a method other than the processing process, and preferably cheese specialties obtained by recombination or retexturing. Various methods of preparation are known to persons skilled in the art.

Preparations are obtained from powdered milk, retentate (concentrated milk) obtained by ultrafiltration. These methods allow the rapid obtaining of cheese in just a few steps: mixing powdered milk with water, acid or fat solutions, the possible addition of enzymes, heating the mixture thus obtained, addition of various additives. These technologies mainly use recombination to achieve the cheese from powdered milk protein concentrates and butter. For example, WO 03/051130 describes the mixture of concentrated proteinaceous materials (CPM) with oils and fats in order to obtain a protein paste, then the addition of water, acids, acidifying ferments, and then heating to 75-95° C., cooling and moulding.

Another class of technologies is described in WO 2006/030128 and WO 2008/151820, allowing the production of cheese from an efficient recombination method from specific dairy powders and appropriate recombination tools. The use of protein concentrate with reduced lactose (i.e. containing less than 10% by weight lactose based on the total weight) is required to avoid excessive acidification in successive steps involving the addition of acidification ferments, which would prevent obtaining products like refined traditional cheeses.

Known retexturing methods are described, for example, in EP 1345497, which allows one to obtain a viscous cheese paste product.

Coating

The materials used for the coating are suitable for contact with food, and preferably of "food" grade, but are not intended to be ingested. It is therefore necessary to remove the coating of the coated cheese product prior to consumption of the cheese material that it contains.

The coating does not adhere to the cheese material on its removal at the time of consumption of the cheese material.

According to one embodiment, the coating is removed by tearing it off by pinching it before consumption of the cheese material. Preferably, the coating consists of a plastic material that is malleable and ductile.

By "plastic material", one means a material which is capable of being deformed as a result of a plastic visco-elastic behaviour.

In another embodiment, the coating of the cheese product includes an opening system for opening the coating by tearing and, possibly, reinforcing the structure of the coating.

In another embodiment, the coating is removed by breaking it, wherein the cheese material is advantageously removed from the coating by pressure between the of one and the same hand. In this case, the coating material has a fragile visco-elastic behaviour.

The coating typically has a thickness of 0.1 mm to 5 mm, preferably 0.1 mm to 3 mm, more preferably 0.2 mm to 2 mm.

The coating is stable up to a temperature of at least 45° C., i.e. it does not melt and does not exhibit significant change in texture and structure.

Properties of the Coating

The coating of the coated cheese product has the mechanical properties of a malleable wax at a storage or consumption temperature (1° C. to 40° C.).

The coating of the cheese coated product according to the invention preferably has the properties of a wax coating as conventionally used for the coating of hard cheese by dipping it in the said wax in the molten state, in particular as described in patent application Patent FR 643128.

On the one hand, the coating prevents the drying of the cheese material during storage and distribution or, on the other, contamination and alteration of the cheese by microorganisms.

The coating around the cheese material consists of one or more layers and has at least one coating layer sealing against moisture and microorganisms, and, possibly, the air.

By "sealing against moisture", one means that moisture does not penetrate the coating to a significant degree, and that the coated cheese product does not dry out.

One can evaluate the drying of a coated cheese product according to the invention by measuring the loss in mass over time of the said cheese product stored at 4° C. at a relative humidity of 70%. The loss of mass of a coated cheese product according to the invention through drying is less than 1% after one month under these conditions. As a comparison and under the same conditions, the loss in weight of an uncoated cheese product of 20 g is 6% in just two days.

By "sealing against microorganisms", one means that the microorganisms do not pass through the coating and that the coating completely isolates the cheese product from microorganisms.

Preferably, the coating of the coated cheese product is airtight.

By "airtight", one means that the air, especially oxygen, does not pass through the coating.

This property is used to help prevent drying and spoilage of the coated cheese product by microorganisms.

Outer Layer and Coating Composition C1

The coating composition C1 comprises at least one hydrophobic polymer which provides the outer layer with its sealing against moisture and microorganisms, and, possibly, with the air. The outer layer acts as a barrier to the outside and protects the cheese product.

The outer layer is compatible with food contact but is generally not ingestible.

The outer layer has a hydrophobic character, i.e. water does not spread in contact with the said layer, but forms droplets with a high contact angle, generally greater than 90°.

By "hydrophobic" polymers, one means a polymer that is insoluble in an aqueous medium, wherein the solubility of water is very low (typically less than 1% by weight), and is capable of giving the composition containing it a character that is impermeable to moisture and water (in liquid or vapour form). A hydrophobic polymer is typically obtained from the polymerisation of a mixture of monomers comprising hydrophobic monomers, such as hydrocarbon type monomers or monomers comprising at least one hydrocarbon fatty chain. The hydrophobic polymers are generally free of hydrophilic functional groups such as electrically charged functions, anionic or cationic functions, polar functions, or functional groups capable of forming hydrogen bonds with oxygen and nitrogen atoms.

Typically, the hydrophobic polymer or the mixture of hydrophobic polymers is present in the coating composition C1 according to a content by weight of at least 5%, preferably at least 10%, and more preferably at least 20%, and even more preferably at least 50%, with respect to the total weight of the coating composition C1.

Preferably, the coating composition C1 is free of water.

Preferably, the coating composition C1 consists essentially of a hydrophobic polymer or a mixture of hydrophobic polymers, wherein the other components of the said coating composition C1 are minority additives.

Preferably, the hydrophobic polymer is selected from the group consisting of polyolefins, copolymers based on vinyl acetate, copolymers based on styrene, copolymers based on vinyl esters of fatty acids, copolymers based on acrylates of fatty alcohols, copolymers based on methacrylates of fatty alcohols, copolymers based on ethers of fattys alcohol and their mixtures.

The hydrophobic polymer may also be selected from biopolymers such as terpene resins and derivatives thereof in hydrogenated forms, or in the form of esters, hydrophobic gums such as rosin and its derivatives, in hydrogenated forms or in the form of esters.

The hydrophobic polymer may also be selected from among basic gums, as mentioned below.

By "polyolefin", one means a polymer derived from the polymerisation of an olefin or an olefin mixture. By "olefin" or "alkene", one means an unsaturated hydrocarbon, linear or branched, typically $C_2$-$C_{10}$, having at least one C=C bond.

As polyolefins, one may mention, for example, polyethylene and polypropylene.

By "copolymer based on vinyl acetate", one means a copolymer, random or block, derived from the polymerisation of a monomer mixture comprising at least 10%, preferably at least 30%, advantageously at least 50% and more advantageously at least 70% by weight of vinyl acetate with respect to the total weight of monomers.

Among copolymers based on vinyl acetate, may be mentioned, for example, vinyl acetate-based and ethylene-based copolymers or copolymers based on vinyl acetate and vinyl laurate, and, in particular, those used in the manufacture of chewing gums. These include for example the commercial products from the company Wacker: Vinnapass20® and Vinnapass40®.

Vinnapass20® polymer comprises 20% by weight of vinyl laurate and 80% by weight of vinyl acetate. It has an average molecular weight (Mn) of 240 000 g/mol.

Vinnapass40® polymer comprises 40% by weight of vinyl laurate and 60% by weight of vinyl acetate. It has an average molecular weight (Mn) of 450 000 g/mol.

By "styrene-based copolymer", one means a copolymer, random or block, derived from the polymerisation of a monomer mixture comprising at least 10%, preferably at least 30%, advantageously at least 50% and more advantageously at least 70% by weight of styrene, with respect to the total weight of monomers.

Among copolymers based on styrene, may be mentioned, for example, polystyrene-isoprene-styrene (SIS) copolymers, the SIS/SI copolymer mixture, polystyrene-butadiene-styrene (SBS) copolymers or the SBS/SB mixture, and, very particularly, grades authorised for the manufacture of coatings, preferably the grades used in the manufacture of chewing gum and bubble gum.

By "fatty acid", one means an aliphatic chain carboxylic acid (i.e. having only carbon and hydrogen atoms), linear or branched, saturated or unsaturated, and typically having from 2 to 24, preferably 6 to 24, preferably 12 to 24 carbon atoms.

By "fatty alcohol", one means an aliphatic chain alcohol (i.e. having only carbon and hydrogen atoms), linear or branched, saturated or unsaturated, and typically having from 2 to 24, preferably 6 to 24, preferably 12 to 24 carbon atoms.

By "copolymer based on vinyl esters of fatty acids", one means a copolymer, random or block, derived from the polymerisation of a monomer mixture comprising at least 10%, preferably at least 30%, advantageously at least 50% and more advantageously at least 70% by weight, of vinyl esters of fatty acids with respect to the total weight of monomers. Examples include copolymers from the company Wacker, Vinnapass20® and Vinnapass40® as well as copolymers described in FR2958120A1.

By "copolymer based on acrylates of fatty alcohols", one means a copolymer, random or block, derived from the polymerisation of a monomer mixture comprising at least 10%, preferably at least 30%, preferably at least 50% and more preferably at least 70% by weight of acrylates of fatty alcohols with respect to the total weight of monomers.

By "methacrylate copolymer based on fatty alcohols", one means a copolymer, random or block, derived from the polymerisation of a monomer mixture comprising at least 10%, preferably at least 30%, advantageously at least 50% and more advantageously at least 70% by weight of methacrylates of fatty alcohols with respect to the total weight of monomers.

By "copolymer based on ethers of fatty alcohols", one means a copolymer, random or block, derived from the polymerisation of a monomer mixture comprising at least 10%, preferably at least 30%, preferably at least 50% and more preferably at least 70% by weight of ethers of fatty alcohols with respect to the total weight of monomers.

According to one embodiment, the coating composition C1 further comprises a plasticiser, preferably authorised as a food additive or of high molecular weight (greater than 2000 g/mol) in order to limit or completely prevent its possible migration, and with a content by weight of 0.1% to 50% with respect to the total weight of the coating composition C1.

Without wanting to be bound to any particular theory, the addition of a plasticiser in the coating composition C1 improves its properties of flexibility, elasticity, plasticity and malleability. The plasticiser also helps to improve the texture of the hot coating composition C1 during the coating method according to the present invention.

Preferably, the plasticiser is selected from the group consisting of fatty acid esters of polyols and of fatty acid esters and fatty alcohols.

By "polyol" or polyalcohol, one means an organic chemical compound comprising several –OH groups.

As a polyol suitable for esterification with the fatty acids for use as a plasticiser, one may mention, for example, glycerol, sorbitol, sorbitan, xylitol, sucrose, sterols and plant polyphenols.

As a plasticiser of the coating material C1 in the molten state, one may also mention carnauba wax in the melted state, fatty material hydrogenated or not, sorbitan tristearate or any other ester of a fatty acid.

According to one embodiment, the coating composition C1 further comprises a bulking agent, preferably with a content of 0.1% to 60% by weight with respect to the total weight of the coating composition C1.

Preferably, the bulking agent is selected from the group consisting of inorganic fillers such as silicates, carbonates, phosphates and sulphates, vegetable flour, wood particles or micronised nut shells, animal products, synthetic products made from renewable resources, and mixtures thereof. Advantageously, the bulking agent is selected from the group consisting of talc, kaolin, calcium carbonate, calcium sulphate, sodium chloride, and mixtures thereof.

Without being bound to any particular theory, the incorporation of a bulking agent reinforces the mechanical structure of the coating. This allows reduction of the thickness of the coating while maintaining excellent resistance to shocks during the various stages of manufacture, packaging (e.g. putting in secondary packaging or bundling of small format products) and distribution of the product. Moreover, this reduced thickness favours the easy removal of the coating at the time of consumption, while increasing the tearable character of the coating when sold. For certain large quantities, they provide a very significant change in the mechanical behaviour of the polymer mixtures, providing them with significant malleability properties that are sought for the coatings described herein. One can, for example, mention their use in the field of chewing gum or modelling clay.

According to one embodiment, the coating composition C1 further comprises a pigment, organic or inorganic, preferably in a content of 0.1% to 5% by weight with respect to the total weight of the coating composition C1.

The incorporation of a pigment in the coating composition C1 can change the optical properties of the coating to give a colour and/or appearance to coated cheese that is acceptable to the consumer.

At the same time, the pigment can also impart light barrier properties to the coating.

It is within the scope of the person skilled in the art to determine which of the available pigments and dyes and, preferably, in the nature of food, is a suitable pigment as a function of the optical properties he wishes to give to the coating.

Preferably, the pigment is selected from the group consisting of mica, quartz, metal oxides of iron or titanium, aluminium particles, Lithol Rubin BK and carbon black.

Preferably, the dye or pigment is only incorporated in the outer layer of the coating.

According to one embodiment, the coating composition C1 further comprises a compatibilising agent, preferably in a content by weight of 0.1% to 10% with respect to the total weight of the coating composition C1.

The incorporation of a compatibilising agent improves the stability of the coating composition C1 or its adherence to another layer, for example when it comprises a bulking agent or when it is in contact with the coating composition C2.

The compatibilising agent is typically a compound having surfactant properties (molecule or polymer) and is preferably selected from the group consisting of hydrogenated long chain fatty acids ($C_{12}$-$C_{24}$) and their salts (sodium, potassium, calcium or magnesium) and polymers having many hydrophilic and hydrophobic functions, such as a copolymer derived from the polymerisation of ethylene or propylene with methacrylic acid or its salts.

As an example of a compatibilising agent, may be mentioned the polymer Surlyn8920® from the company DuPont™, which is a copolymer of ethylene and methacrylic acid, wherein the carboxylic acid groups have been partially neutralised with sodium ions. This polymer has a viscosity index (MFI/190° C./2.16 kg) of 0.9 g/10 min measured according to ASTM D1238, and a melting temperature of 88° C. measured by DSC (Differential Scanning Calorimetry Analysis) according to ASTM D3418.

According to one embodiment, the coating composition C1 further comprises a cohesion agent, preferably with a content by weight of 0.1% to 5% with respect to the total weight of the coating composition C1.

The incorporation of a cohesion agent can increase the cohesive properties of a material in the field of use thereof by increasing its mechanical impact resistance thus making it less fragile and less friable.

Preferably, the cohesive agent is selected from the group consisting of polyvinyl acetate, vinyl acetate-ethylene copolymer, ethylene copolymer and butanol methacrylate.

According to one embodiment, the coating composition C1 further comprises an antifungal agent, preferably with a content by weight of 0.1% to 5% with respect to the total weight of the coating composition C1.

The incorporation of an antifungal agent can protect the surface of the coated cheese during packaging.

Alternatively, the antifungal agent may be grafted onto the surface of the coating.

Among antifungal agents, mention may be made of natamycin, sorbic acid and its potassium salts, sodium or calcium, fatty acids and especially propanoic acid, benzoic acid and its salts, nisin, polylisine.

According to one embodiment, the coating composition C1 further comprises a nucleating agent, preferably with a content by weight of 0.1% to 5% with respect to the total weight of the coating composition C1.

The incorporation of a nucleating agent allows modification of the crystallisation properties and optical and mechanical properties of the coating. Among nucleating agents may be mentioned zinc stearate associated with calcium 1,2-cyclohexanedicarboxylate, known under the trade name of E-Hyperform® HPN20 from Milliken, some silicates such as talc and kaolin, or polymers of the ionomer Na+ type such as Surlyn8920® from the company DuPont™.

As a preferred coating composition C1 may be mentioned mixtures derived from basic gums used in the field of chewing gum and based on SIS, SI, SIS/SI, SBS, SB or SBS/SB copolymers, mineral fillers such as talc and a resin such as hydrogenated pine resin.

The presence of vinyl fatty acid copolymers is also preferred in order to provide a plasticising and/or cohesion effect.

Various preferred variants of the coating composition C1 according to the invention are presented below.

Variant 1

One uses a composition based on gum base for chewing gum or bubble gum containing one or more natural gums, for example vegetable gums such as chicle or natural rubber (Hevea).

Similarly, the gum base may contain one or more synthetic gum base elastomer-type polymers such as copolymers of block copolymers based on styrene (S) and butadiene (B) or isoprene (I). These copolymers typically comprise two separate blocks or three separate blocks or a mixture of two copolymers and three blocks. These copolymers can have linear or radial structures. SB, SBS, SBS/SB, SI, SIS, or SIS/SI copolymers may be mentioned. Preferably in these copolymers, the styrene is 10 to 50% by weight, more preferably from 10 to 40% by weight, more preferably from 15 to 35% by weight with respect to the total weight of the copolymer. Preferably, these styrene copolymers have viscosity numbers from 0 to 40 g/10 min (MFI measured according to ASTM D 1238, 200° C./5 kg).

Other polymers and copolymers used in the field of chewing gum can also be used in such formulations, for example polyethylene, polyisobutylene, poly(vinyl acetate), copolymers of ethylene and vinyl acetate, polyolefins branched or not, iso butylene-isoprene copolymers, vinyl acetate copolymers and vinyl laurate, and other vinyl esters of fatty acids.

Preferably, the polyethylenes have average molecular weights (Mn) greater than 2000 g/mol, preferably greater than 10 000 g/mol, more preferably greater than 50 000 g/mol, and even more preferably greater than 100 000 g/mol. Preferably, the polyethylene is in the coating composition C1 according to a weight proportion ranging from 0.1 to 70%, preferably 1 to 50%, for example from 1 to 35%. Polyethylene is generally used in admixture with other hydrophobic polymers in the coating composition C1.

Preferably poly(vinyl acetate) or vinyl acetate-ethylene copolymers have average molecular weights (Mn) between 10 000 and 200 000 g/mol, and more preferably between 15 000 and 100 000 g/mol. Preferably, the poly(vinyl acetate) or vinyl acetate-ethylene copolymers are included in the coating composition C1 according to a weight proportion of 0.1 to 70%, advantageously 1 to 50%, and for example from 1 to 35%. These polymers are generally used in admixture with other hydrophobic polymers in the coating composition C1.

Preferably, the vinyl ester copolymers of fatty acids are made from vinyl esters of fatty acids whose fatty acid chain lengths are between 2 to 22 carbon atoms. According to one embodiment, the copolymers are random type, block or grafted. Preferably, these copolymers have an average molecular weight (Mn) of between 10 000 g/mol and 500 000 g/mol, preferably between 10 000 and 250 000 g/mol and, for example, between 15 000 and 125 000 g/mol.

Structuring agents can also be included in the composition such as terpene resins, derivatives of vegetable resins (rosin, pine resin), vegetable, animal or vegetable waxes of petroleum origin such as microcrystalline waxes, Fischer-Tropsch waxes, polyethylene waxes, carnauba wax, or beeswax.

Filling agents can also be incorporated into the composition of these gum bases such as magnesium silicate (talc), or calcium or magnesium carbonates.

For example, gum bases such as CHICA BBT® CAROL BBT® from GumBase & Co™ can be used to make the said coating composition C1. These gum bases for chewing gum contain a copolymer of styrene and butadiene, and talc with a content of 37% by weight. The Vicat softening temperature, measured according to ASTM D1525, is 78° C. for CHICA BBT®, and 67° C. for CAROL BBT®.

Advantageously, the total quantity of talc (originally present and added) represents 30 to 70% of the total weight of the said coating composition, more preferably from 35 to 60% and even more preferably from 40 to 55% of the total.

This type of hot material (typically between 80° C. and 140° C.) may be easily poured onto a flat surface or a roller to form a coating film, according to one of the variants described above.

After a first cooling, the film solidifies but is still sufficiently malleable to allow a pressure seal.

When cold, i.e. at the cheese product consumption temperature, the coating thus obtained is malleable and tearable allowing the opening of the coating and access to the product.

Examples of formulations are given in the following table:

| Mixture | Gum base (% by weight) | Talc added/total content of talc (% by weight) | Viscosity* (Pa · s) | | | | | |
|---|---|---|---|---|---|---|---|---|
| | | | 120° C. | 110° C. | 100° C. | 90° C. | 80° C. | 70° C. |
| 1 | CHICA (100) | 0/37 | 16.3 | 21.1 | 26.9 | 41.9 | 59.1 | Nm |
| 2 | CHICA (91) | 9/42.7 | 24.4 | 35.5 | 56.5 | Nm | Nm | Nm |
| 3 | CHICA (80) | 20/49.6 | 30.7 | 31.6 | Nm | Nm | Nm | / |
| 4 | CAROL (100) | 0/38 | 35.2 | 39.7 | 38.3 | 39.8 | 44.1 | 58.0 |
| 5 | CAROL (91) | 9/43.6 | 34.4 | 36.5 | Nm | Nm | / | / |
| 6 | CAROL (80) | 20/50.4 | Nm | Nm | / | / | / | / |

Nm: not measurable due to poor adhesion between the plates and the viscous film.
/: Not determined
*Measured in shear on Physica MCR301 from Anton Paar with ridged geometry plane PP 25/P2 (diameter: 24.962 mm - gap 0.256 mm) at various temperatures and with a shear gradient between 1000 $s^{-1}$ and 10 $s^{-1}$.

Variant 2

As the coating composition C1, one can use a composition based on high melting point waxes, so that the packaging temperature is 2° C. to 30° C. lower than the melting temperature of the said waxes. At such a temperature, the said waxes are easily malleable and can thus be easily sealed between the two half moulds of the rollers, as described above. One may add to this formulation a polyolefin type polymer having a crystallisation temperature in the same temperature range. More particularly, one may consider a branched polyolefin such as VYBAR® 103 or VYBAR® 206 from Baker Hughes™. These polymers are hyperbranched polymers obtained by polymerisation of the alpha-olefins mixture and are respectively of average molecular weight (Mn) of 4400 g/mol and 2600 g/mol. Their melting temperatures are respectively 74° C. and 54° C.

Among waxes having suitable melting temperatures may be mentioned Fischer-Tropsch waxes, microcrystalline waxes with a high melting point, carnauba wax, polyethylene wax, polypropylene wax, high melting point hydrogenated fat. Advantageously, the melting point of the wax exceeds 45° C., preferably 60° C., more preferably 70° C. and even more preferably 80° C.

Additives may also be added allowing processing in bulk or gel, for example stearic acid or salts thereof, crystalline polyol esters (mono, di and tristearate, sorbitan mono, di and tristearate glycerol), sterols and plant sterol esters.

| Coating composition | Olive oil | VYBAR ® 260 | Talc 8218 Luzenac |
|---|---|---|---|
| 7 | 40.5% | 10.0% | 49.5% |

Filling agents may also be added to modify the thermo-mechanical properties of waxes, as has been shown with polypropylene wax formulation (molecular weight Mn=5000 g/mol) containing calcium carbonate and talc.

| Coating composition | Tc (° C.) | $T_{fmax}$ (° C.) | ΔH (J/g) |
|---|---|---|---|
| 8: 100% polypropylene (PP) | 117.4 | 158.6 | 101.4 |
| 9: 77% PP + 15% Talc8218 + 3% TiO$_2$ + 5% CaCO$_3$ | 112.2 | 129.1 | 34.0 |
| 10: 82% PP + 10% Talc8218 + 3% TiO$_2$ + 5% CaCO$_3$ | 126.8 | 152.2 | 86.1 |
| 11: 84% PP + 8% Talc8218 + 3% TiO$_2$ + 5% CaCO$_3$ | 124.3 | 148.0 | 74.6 |
| 12: 84% PP + 10% Talc8218 + 3% TiO$_2$ + 3% CaCO$_3$ | 128.3 | 152.6 | 84.0 |
| 13: 86% PP + 8% Talc8218 + 3% TiO$_2$ + 3% CaCO$_3$ | 127.5 | 152.4 | 86.6 | where Tc(° C.) is the crystallisation temperature observed by DSC (TA Instrument 2920CE) by cooling to 4° C. from an initial temperature of 200° C. for 2 minutes and $T_{fMAx}$(° C.) is the peak melting temperature of the melting of the same composition at an even higher temperature.

Among the fillers may be mentioned calcium carbonate (and other carbonates), silicates including magnesium (talc) and aluminium (kaolin) and other minerals, wood flours or micronised shells of nuts.

These compositions 9 to 13 lead to mechanical behaviour such as the coating being brittle and thus breaking in the fingers of one hand and eliminating the need for an opening system.

Variant 3

As the coating composition C1, one can also use deodorised and bleached vegetable oil to form a hydrophobic coating layer.

Vegetable oils include, for example, soybean, sunflower, rapeseed, olive, palm, peanut, and coconut oil. Other oils may also be used such as walnut, hazelnut, flax, cotton, and corn oil. Oils with low saturation are preferred to avoid the risk of oxidation.

This film may contain amorphous or crystalline additives to enable the gelling of the coating layer, as described below.

Polymers are used to enable the gelling of oils, but also to confer film-forming properties. Polymers having thermal transitions (melting and glass mainly) above 70° C. are preferred. One may mention, for example, block copolymers based on styrene, isoprene, butadiene (1,3 or 1,4) or copolymers of ethylene and propylene, polybutylene or polybutene.

The gel may also be formed from fatty acid derivatives, such as esters of plant sterols, mono, di and tri esters of sorbitan, mono, di and tri esters of glycerol, mono and polyesters of sucrose, sucrose, sorbitol, polyglycerol, esters of terpene resin, rosin esters, esters and ethers of cellulose, esters and ethers of starch or hemicellulose, sterol esters. Preferably, these substances are amorphous and have surfactant properties.

Filling agents may be added such as calcium carbonate (and other carbonates), silicates including magnesium (talc) and aluminium (kaolin), micronised shells of nuts. The use of these fillers is preferred in order to remove the oily/fat appearance of this type of composition (see the example of composition 7).

Examples of coating composition are given below:

| Coating composition | Olive oil (%) | Polymer SIS (%) | Sorbitan mono stearate (%) |
|---|---|---|---|
| 14 | 80 | 0 | 20 |
| 15 | 85 | 15 (VECTOR ® 4411) | 0 |
| 16 | 85 | 15 (VECTOR ® 4114) | 0 |
| 17 | 90 | 10 (VECTOR ® 4411 et 4114) | 0 |

Variant 4

The use of filling agents to give the coating composition C1 the behaviour of a wax, i.e. its malleable and tearable character, is preferred with preferentially lipophilic fillers. Talc and kaolin have an oil absorption capacity of more than 40% to 70% depending on the grade. Moreover, these substances are chemically inert, of food grade, are not prone to migration and are not likely to introduce a bad taste or odour to the coated cheese product.

When these fillers are added at a sufficiently high concentration, the behaviour of the coating composition is significantly modified thereby: it becomes soft, rubbery, paste-like. In addition, the presence of talc, for example, allows one to make the material low fatty because it retains oil (high solubility as shown above).

According to the embodiments, one uses compositions based on polymers that are completely or partially biobased. In particular, one uses alkyl side chain polyesters in the form of homopolymers, copolymers or mixtures of these polymers, especially PHA or poly(hydroxyalkanoate), or the fatty acid vinyl polyesters, or alternatively of fatty alcohol polyacrylates.

Inner Layer and Coating Composition C2

In the case where the coating further comprises at least one inner layer, the coating composition C2 which constitutes the said inner layer is preferably an aqueous coating composition. The said inner layer is preferably in contact with the cheese material.

By "aqueous coating composition", one means a composition, usually in gel form, comprising at least 10%, preferably at least 20%, more preferably at least 30% by weight of water with respect to the weight of said composition. Such compositions are described below.

Without being bound to a particular theory, the presence of such an inner layer between the outer layer, preferably impermeable to water, and the cheese material allows one to prevent migration of hydrophobic compounds from the external layer towards the cheese material.

According to one embodiment, the coating composition C2 is an aqueous coating composition comprising at least one polysaccharide or a polysaccharide derivative.

Typically, the polysaccharide or a polysaccharide derivative (or mixture thereof) is present in the coating composition C2 according to a content by weight of at least 10%, preferably at least 30%, more preferably at least 40%, even more preferably at least 50%, with respect to the total weight of the coating composition C2.

Typically, the coating composition C2 comprises a water content of 30% to 80%, preferably 40% to 70%, more preferably from 50% to 60% by weight with respect to the total weight of the coating composition C2.

By "polysaccharide derivative" polymer, one means, for example, an acetyl derivative, an ether, a methyl carboxy derivative or a methylated hydroxypropyl derivative of polysaccharide.

As a polysaccharide or polysaccharide derivative, may be mentioned, for example, starch and its derivatives, cellulose and its derivatives, cellophane, alginate, pectate, xanthan, gellan, carrageenan, pullulan, chitosan, chitin and hydrophilic gums.

As a starch derivative may be mentioned hydroxypropylated starch and hydrophobised starch.

As a cellulose derivative, may be mentioned hydroxypropyl methyl cellulose, hydroxypropyl cellulose, methyl cellulose, ethyl cellulose, cellophane or regenerated cellulose.

As a derivative of hydrophilic gums, may be mentioned guar gum or gum. Arabic

According to one particular embodiment, typically when the coating contains an alginate or gellan, the coating is gelled after the shaping of the cheese product coated by the action of divalent cations such as cations of calcium, magnesium or zinc. The cheese material may be the source of the said calcium cations.

According to one embodiment, the coating composition C1 further comprises a compatibilising agent, preferably in a content by weight of 0.1% to 10%, preferably from 0.1% to 5%, based on the total weight of the coating composition C1.

The incorporation of a compatibilising agent improves the cohesion between the outer coating layer and the inner coating layer and thus improves the stability of the coating.

The compatibilising agent is typically a compound having surfactant properties (molecule or polymer) and is preferably selected from the group consisting of hydrogenated long chain fatty acids ($C_{12}$-$C_{24}$) and their salts (sodium, potassium, calcium or magnesium), and polymers having many hydrophilic and hydrophobic functions, such as a copolymer derived from the polymerisation of ethylene or propylene with methacrylic acid.

The compatibilising agent can be incorporated only in the outer layer or the inner layer, according to its affinity for one or other of the layers.

Thus, in the case of an inner layer comprising a hydrophilic polymer or calcium alginate gellan, it will not involve a compatibilising agent, the latter being present in the outer layer as a long chain fatty acid or, for example, a copolymer derived from the polymerisation of ethylene or propylene with methacrylic acid or its salts. As an example of such a compatibilising agent may be mentioned Surlyn8920® from the company Dupont™.

Advantageously, specific hydrophobic and hydrophilic coating compositions provide good adhesion between the two layers despite their opposing hydrophilic and hydrophobic characters.

Systems adapted for this good adhesion are, for example:
- an inner hydrophilic layer based on alginate or gellan, crosslinked with calcium salts such as calcium chloride, calcium acetate or else calcium phosphate, and
- an outer layer impermeable to moisture, such as a gum base containing long chain fatty acids or an anionic amphiphilic polymer, such as a copolymer of ethylene and acrylic acid.

Advantageously, a very thin layer of a polymer having the intermediate properties of the inner and outer layers may also be used between the said layers, such as a terpolymer of ethylene, vinyl acetate and maleic or fumaric acid.

The present application also relates to the use of a coating composition C1 as defined above for the preparation of a coated cheese product as defined above.

Example of Preparation of a Coated Cheese Product Comprising a Coating Layer C1 and a Coating Layer C2

As an example of a coating with two composition layers C1 and C2 may be mentioned the following implementation.

The inner layer in contact with the product, consists of a composition C2 based on acetylated gellan and water, whose gelling temperature is 80° C. The behenic acid, whose melting temperature is 80° C. is added to this composition C2 in order to represent 5% of the total weight.

The outer layer of the composition C1 consists of CHICA BBT gum base added to talc, so that the total weight of talc was 50%.

The composition C1 is heated and poured onto two rollers to form two films of the composition C1, then an aqueous solution of calcium phosphate is sprayed onto the surface of the said two films. In this way, little residual water remains present on the surface of the film due to the temperature of the films and the small amount sprayed. The second composition C2 is then poured onto the film surface. The presence of carboxylic acid functions present in both the inner and outer layers combined with calcium phosphate calcium ions, allows the creation of strong ionic bridges between the two layers.

A cheese preparation in the form of a fresh processed cheese (Kiri®), processed cheese (Vache qui Rit®, Apé ricube®) or fresh cheese (Boursin®) is then injected between the two films that are brought to the level of the injection nozzle and between the rotary moulds, and then the whole is shaped by moulding and sealing.

The cooling of the coated cheese product thus obtained below 65° C. allows the gelling of the different composition layers C1 and C2, whose adhesion properties are ensured by calcium ions sprayed between the two compositions, and then by those provided thereafter by the dairy product (by transfer through the composition layer C2).

Coated Cheese Product

The invention also relates to a coated cheese product comprising a core comprising a cheese material and a coating that is malleable at the storage temperature of the said coated cheese product and sealed against moisture and microorganisms, which completely surrounds the core at its periphery, wherein the said cheese material is processed cheese, fresh cheese, fresh processed cheese or a cheese obtained by a recombination process.

This coated cheese product has the advantages of the coated cheese product obtainable by the method according to the invention.

The coating of the said coated cheese product typically comprises a film coating composition C1 as defined above, in contact with the outside.

Alternatively, the said coating further comprises a film of the coating composition C2 as defined above, in contact with the core.

Preferably, the cheese material is a processed cheese, a fresh cheese or a fresh processed cheese.

According to one embodiment, the coating comprises a filling agent as defined above.

The invention claimed is:

1. A method for preparing at least one coated cheese product, the method comprising the steps of:
    forming two coating films by providing a coating composition C1 in a viscous state and cooling the coating composition C1;
    injecting a cheese material in a viscous state between said two coating films wherein said cheese material is in contact with said two coating films, said two coating films being separated prior to injecting the cheese material, wherein said two coating films are malleable at a temperature between 1° C. to 40° C., and wherein each of said two coating films comprising, on an outer face of each of said two coating films, an external layer made of said coating composition C1 in a gelled state, wherein said coating composition C1 comprises:
        at least one hydrophobic polymer or a mixture of hydrophobic polymers, wherein the weight of the at least one hydrophobic polymer or the mixture of hydrophobic polymers is at least 5% with respect to the total weight of the coating composition C1, the at least one hydrophobic polymer or each hydrophobic polymer in the mixture of hydrophobic polymers being selected from the group consisting of polyolefin copolymers based on vinyl acetate, copolymers based on styrene, copolymers based on vinyl esters of fatty acids, copolymers based on acrylates of fatty alcohols, copolymers based on methacrylates of fatty alcohols, copolymers based on ethers of fatty alcohols and their mixtures, and biopolymers,
        a plasticizer with a content by weight of 0.1% to 50% with respect to the total weight of the coating composition C1, and
        a filling agent with a content of 0.1% to 60% by weight with respect to the total weight of the coating composition C1, and
    simultaneous shaping and sealing of the at least one coated cheese product immediately after performing the injecting step, said simultaneous shaping and sealing step is carried out by introducing the two coating films and the cheese material together between two rotating rollers featuring complementary half-cavities to impress a desired shape on the at least one coated cheese product, and said simultaneous shaping and sealing step is performed by applying pressure on the outer face of each of said two coating films, said two coating films being sealed under said pressure to each other, in order to obtain the at least one sealed and coated cheese product comprising a cheese core comprising said cheese material and a hydrophobic coating, which has a coating surface formed by the outer faces of the two coating films, that is malleable at the temperature between 1° C. to 40° C. and sealed against moisture and microorganisms, and completely surrounds the cheese core at its periphery, wherein said hydrophobic coating is formed by assembly by pressure of the two said coating films comprising at least an outer layer of said coating composition C1, wherein the simultaneous shaping and sealing step provides shaping of the hydrophobic coating around the cheese material and sealing of the hydrophobic coating by forming a sealing area integrated in the coating surface such that the cheese material is packaged in the hydrophobic coating without a risk of external microbial contamination.

2. The method according to claim 1, wherein said two coating films each consists of an inner face, and the inner face of each film comprises at least one inner layer of a coating composition C2 in a gelled state, which is different from said coating composition C1, and wherein the hydrophobic coating obtained after the shaping step comprises at least an outer layer of said coating composition C1, and at least one inner layer, which is different from said at least one outer layer, consisting of a coating composition C2, between the cheese core and said at least one outer layer.

3. The method according to claim 2, wherein the step of forming the two coating films further comprises providing said coating composition C2 in a viscous state.

4. The method according to claim 3, wherein the step of forming the two coating films further comprises cooling said coating composition C2 in the viscous state and gelling said coating composition C2.

5. The method according to claim 1, wherein the cheese material is a processed cheese, a fresh cheese, a fresh processed cheese or a cheese obtained by a recombinant method.

6. The method according to claim 1, wherein the at least one hydrophobic polymer or each hydrophobic polymer in the mixture of hydrophobic polymers is selected from the group consisting of polyolefin copolymers based on vinyl acetate, copolymers based on styrene, copolymers based on vinyl esters of fatty acids, copolymers based on acrylates of fatty alcohols, copolymers based on methacrylates of fatty alcohols, copolymers based on ethers of fatty alcohols, hydrophobic gums, gum bases, and mixtures thereof.

7. The method according to claim 1, wherein the filling agent is a mineral filler.

8. The method according to claim 2, wherein said coating composition C2 is an aqueous coating composition comprising at least one polysaccharide or a polysaccharide derivative.

9. The method according to claim 8, wherein the polysaccharide or polysaccharide derivative is selected from the group consisting of starch and its derivatives, cellulose and its derivatives, cellophane, alginate, pectate, xanthan, gellan, carageenan, pullulate, chitosan, chitin and hydrophilic gums.

10. The method according to claim 7, wherein the filling agent is selected from the group consisting of talc, kaolin, calcium carbonate, calcium sulphate, sodium chloride, and mixtures thereof.

* * * * *